United States Patent [19]

Plough

[11] 4,438,795
[45] Mar. 27, 1984

[54] FLEXIBLE PLATEN PLANER
[75] Inventor: Irving L. Plough, Snohomish, Wash.
[73] Assignee: Kimwood Corporation, Eugene, Oreg.
[21] Appl. No.: 370,689
[22] Filed: Apr. 22, 1982
[51] Int. Cl.³ .............................................. B27C 1/08
[52] U.S. Cl. .................................. 144/373; 144/116; 144/129
[58] Field of Search ............... 144/114 R, 116, 117 R, 144/129, 213, 242 A, 253 G, 253 C, 329, 373; 409/141, 135, 136; 51/266; 269/309; 254/93 HP

[56] References Cited
U.S. PATENT DOCUMENTS
2,071,034 2/1937 Hanna .................................... 51/266
2,102,186 12/1937 Nicholson et al. .................. 144/116
2,139,952 12/1938 Giles ..................................... 51/266

FOREIGN PATENT DOCUMENTS
502601 5/1976 U.S.S.R. ........................ 254/93 HP

Primary Examiner—Francis S. Husar
Assistant Examiner—Jorji M. Griffin
Attorney, Agent, or Firm—Kolisch, Hartwell & Dickinson

[57] ABSTRACT

The invention provides a planing device for planing two opposite sides of a workpiece which has a flexible and continuous lower platen cantilevered from its frame. The platen has its free end flexed upward by a pneumatically actuated lever, and cooling passages are provided on the end of the lower platen to dissipate heat due to friction between the lower platen and workpiece.

18 Claims, 5 Drawing Figures

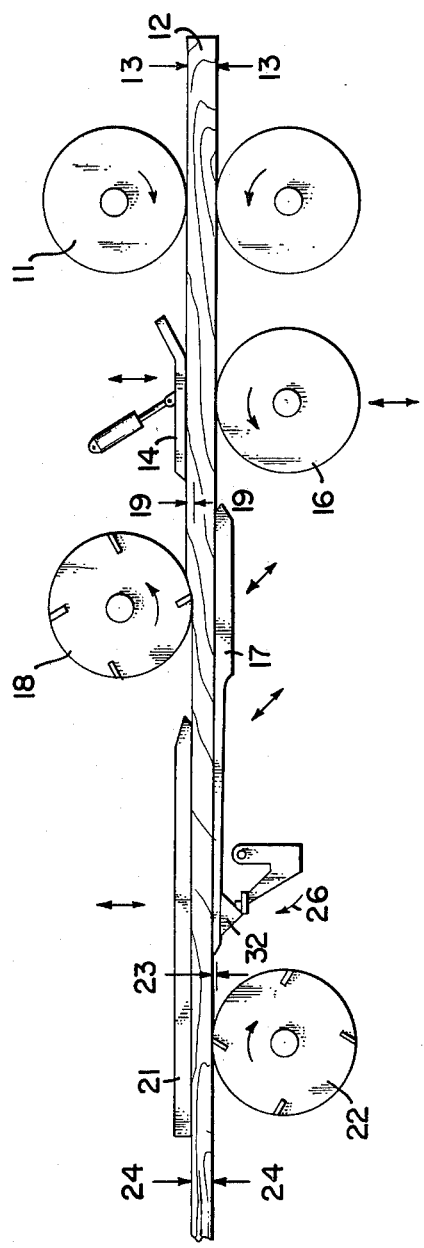
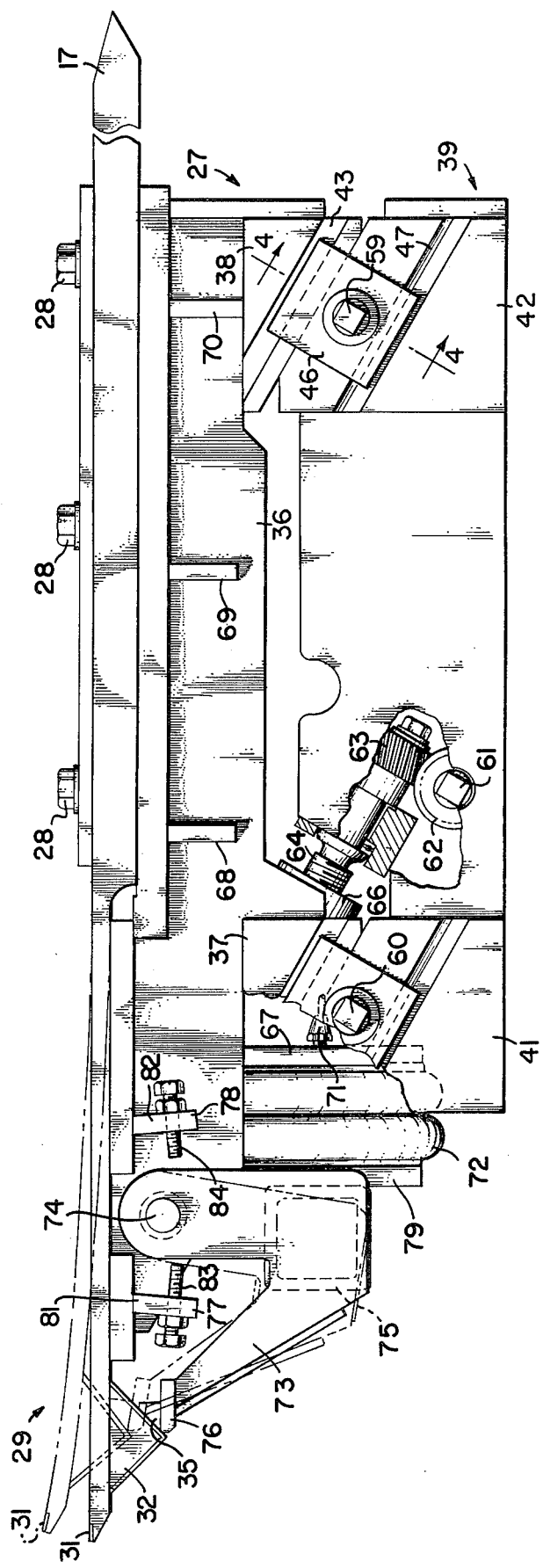
FIG. 2
FIG. 3

FLEXIBLE PLATEN PLANER

BACKGROUND OF THE INVENTION

1. Field of the Invention

The present invention relates to lumber planing devices of the two-way thicknessing type which plane a piece of lumber on two opposite sides to produce a smooth finished piece of a predetermined thickness.

2. Description of the Prior Art

A typical prior art device for planing both sides of a rough sawn piece of lumber has an infeeding mechanism feeding the workpiece across a lower platen which supports it as it travels beneath an upper planing head which surfaces the top of the workpiece. The workpiece then continues on toward a lower planing head which surfaces its bottom. If the workpiece is not held up against an overhead plate, too much may be planed off the lower surface of the workpiece or the lower surface may be planed only in intermittent patches. Up to now, the only way to avoid these occurrences, both of which will adversely affect the grade of the lumber, was to hold the workpiece against an upper platen as it moves over the lower planing head by a hinged end portion of the lower platen which is urged upward by pneumatic or other means.

However, the provision of a hinged segment on the lower platen is in itself a source of problems. First, the hinge creates a crevice in which splinters and pitch accumulate, causing the workpiece to bend and stick as it passes over the lower platen. Accumulated debris also interferes with the setting of the desired lower to upper platen distance, resulting in inaccuracy in the dimensions of the finished product. Furthermore, the debris can scratch the lower surface of a workpiece, reducing the grade of lumber produced from it.

Another problem associated with a hinged and segmented lower platen is excessive wear caused by platen chatter as uneven portions of a workpiece move over the hinged segment, causing its parts to rattle and impact against one another. This also results in an undesirable noise level. Furthermore, horizontal deflection of the lower platen, causing shifting of the workpiece and strain on the lower platen, results from the hinged mounting of the lower platen.

SUMMARY OF THE INVENTION

The present invention provides a planing device in which the problems inherent in prior art segmented platen devices are eliminated, resulting in a smooth operating, quiet, and highly accurate planer, which will produce the maximum number of full thickness boards possible. The invention has, in place of a hinged and segmented lower platen, a flexible and continuous lower platen which is cantilevered from the frame of the planing apparatus. The platen has its end flexed upward by a pneumatically actuated lever, and cooling means are provided on the end of the platen to dissipate heat due to friction between the lower platen and workpiece.

The novel structure eliminates the problem of debris accumulation and the inaccuracy caused thereby. The invention has increased durability, since the resiliency of the lower platen allows it to respond to unevenness in a workpiece without a rattling and impacting of parts against one another, thus eliminating the excessive wear and noise caused by platen chatter. Horizontal deflection of the lower platen is eliminated by the cantilevered mounting of the platen, ensuring an accurate and smooth finish on a workpiece.

BRIEF DESCRIPTION OF THE DRAWINGS

FIG. 2 is a schematic representation of the operation of a planer using the present invention.

FIG. 3 is a side elevational view, partially broken away, of the flexible platen of the present invention.

DETAILED DESCRIPTION OF THE DRAWINGS

Figure 1:
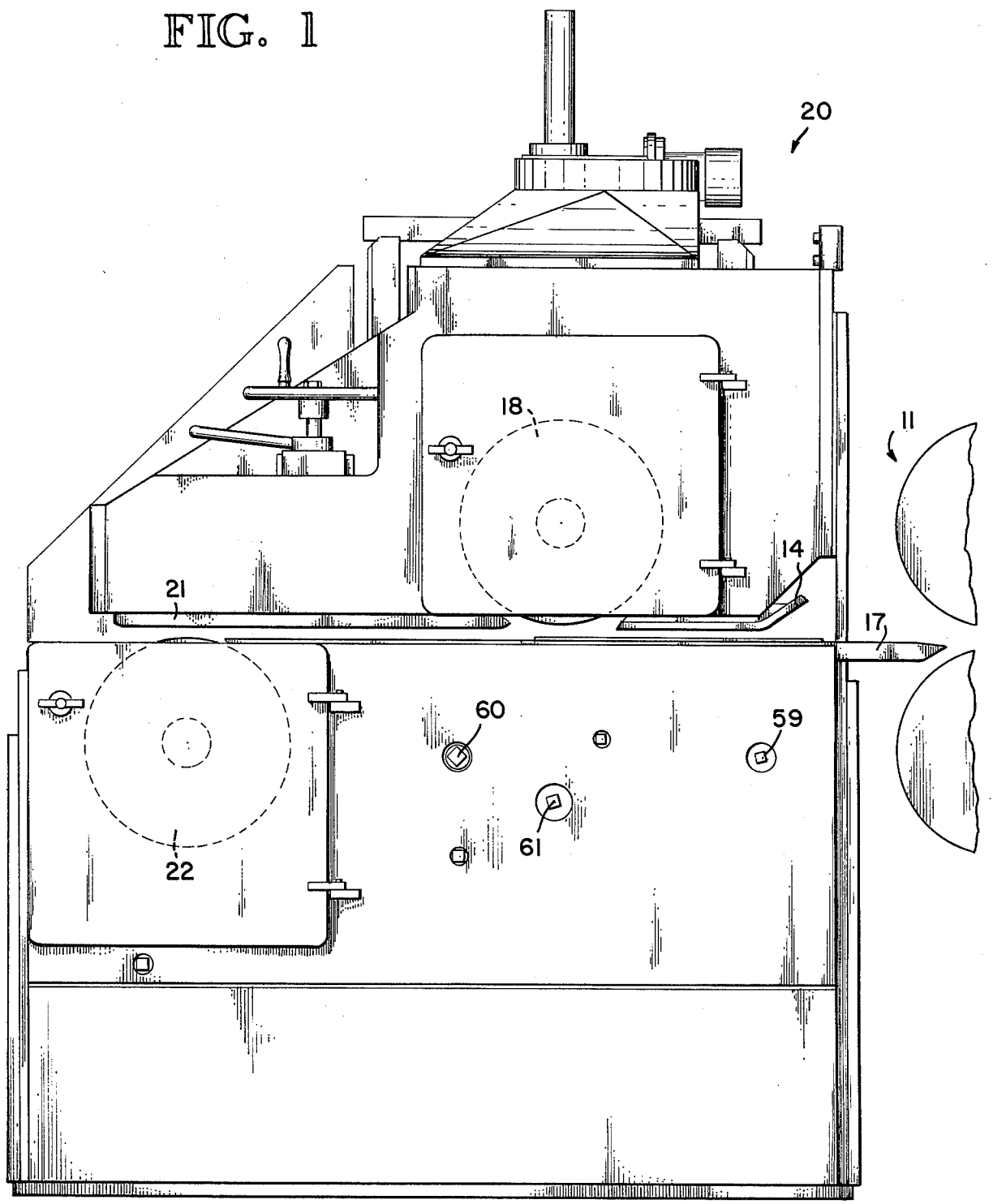
FIG. 1 is a side elevational view of a planer using the present invention.

Referring to FIG. 2, a planing device using one embodiment of the present invention has infeed rollers 11 feeding a workpiece 12 of a thickness indicated by the arrows 13—13 under a chip breaker shoe 14 which holds the workpiece 12 against a steel roller 16. Both the chip breaker shoe 14 and the steel roller 16 are adjustable in a vertical direction as indicated by arrows.

The workpiece 12 then passes over a platen 17 while its top surface is planed by an upper planing head 18 of a conventional type. The upper planing head 18 will remove a predetermined thickness indicated by the arrows 19—19 from the top of the workpiece 12, which will then pass under an upper platen 21 which is adjustable in a vertical direction relative to the lower platen 17, as indicated by the arrow. A lower planing head 22 of a conventional type will remove a thickness from the bottom of the workpiece 12 indicated by the arrows 23—23. If the workpiece has a sufficient initial thickness, the resulting product will be a board smooth on both sides and having the desired predetermined thickness indicated by the arrows 24—24.

In the present invention, the lower platen 17 is flexible at the end near the lower planing head 22, and can flex upward in the direction indicated by arrow 26 to hold the workpiece 12 firmly against the upper platen 21. This flexing is shown in exaggerated form in FIG. 3. If the initial thickness of the workpiece 12 is insufficient, the workpiece 12 will be held against the upper platen 21 by the lower platen 17, thus resulting in a finished product having the maximum possible thickness. In some cases, a workpiece 12 will be rough and thick enough for the lower planing head 22 to partially plane in intermittent patches, but the workpiece 12 will remain rough on the bottom side. However, a finished product of full thickness with some roughness on one side is preferable to one which is smooth but too thin. Thus, the flexible platen of the present invention results in the optimal planing of each workpiece.

Referring now to FIGS. 1, 2 and 3, the invention will be described in more detail. The lower platen 17 and adjacent mechanisms are covered by a housing 20 to protect the machinery and to prevent the escape of wood chips and dust into the workplace. Outside of the housing are the infeed rollers 11 which include, instead of one continuous upper roller, three upper rubber rollers arranged side-by-side and powered by conventional means. The use of a resilient material like rubber, as well as the use of three rollers rather than one continuous roller, accommodates rough or bent workpieces without cracking or splitting them. The lower infeed rollers, which are idle, also include three side-by-side rubber rollers. Inside the housing 20 is a chip breaker shoe 14, to which the infeed rollers 11 feed the workpiece 12, of a conventional type known in the art. The chip breaker shoe 14 serves the function of holding the workpiece 12 firmly down as it passes under the upper planing head 18, as well as ensuring that the workpiece 12 does not split as its upper side is planed.

Prior to being planed by the upper planing head 18, the workpiece 12 moves onto the lower platen 17. The lower platen 17, from its first end near the upper planing head 18 to its opposite end adjacent the lower planing head 22, is one continuous piece which, for most applications, will have a width of between 6 to 18 inches and a length of about four feet. The lower platen 17 is mounted on a platen frame 27 by bolts 28 only at the end near the upper planing head 18, leaving the opposite end cantilevered from the frame. This cantilevered portion 29 is about 18 inches long and is thin enough to ensure adequate flexibility. Typically, the cantilevered portion 29 will be about two-thirds inches thick, compared to about one and one-third to one and two-fifths inch thickness for the rest of the lower platen 17. The top surface of the lower platen 17 preferably will be plated with industrial hard chrome, and the tip of the cantilevered portion 29 will have a carbide insert 31, to protect against excessive wear.

Figure 5:
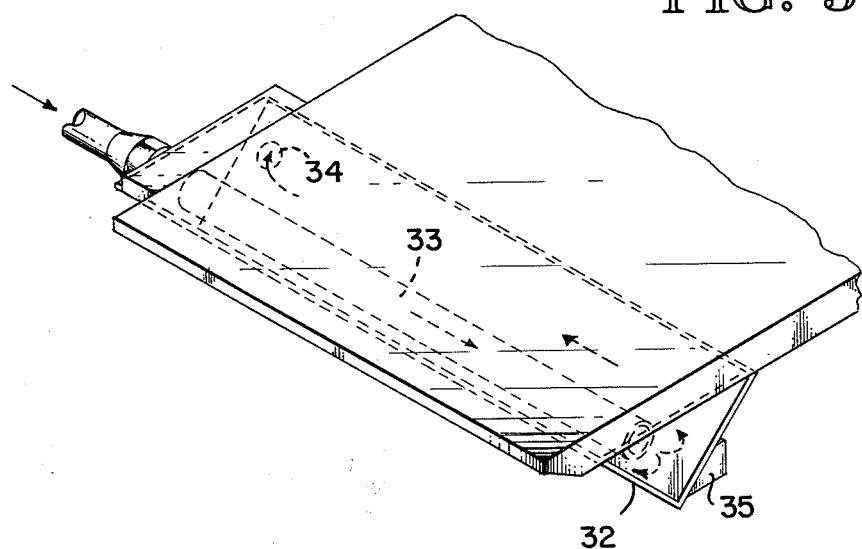
FIG. 5 is a perspective view of the end of the flexible platen.

As is best seen in FIG. 5, mounted to the underside of the lower platen 17 at the tip of the cantilevered portion 29 is a triangular tube 32 closed at both ends which can be formed, for example, from an angle iron. A block 35 welded to the exterior of tube 32 near its vertex runs the length of the triangular tube 32, and an inlet pipe 33 inside the triangular tube 32 extends substantially the length of the tube 32 and through one end wall. To cool the edge of the lower platen 17, coolant fluid such as a glycol/water mixture is pumped in through the inlet pipe 33, and exits through a suitable outlet opening 34 in the triangular tube 32. Since a planing device using the present invention will typically process 1200 board feet per minute, the cooling system is utilized to prevent damage to lumber and equipment from frictional heat buildup in the platen. The use of parallel inlet and outlet fluid flow passages across the width of the lower platen 17 provides substantially even cooling, eliminating the warpage which uneven cooling may cause.

The height of the lower platen 17 can be adjusted in a diagonal direction indicated by arrows in FIG. 2. Diagonal adjustment is preferred over vertical adjustment to maintain proper clearance between the tip of lower platen 17 and the curved lower planing head 22. Pairs of interlocking wedges with diagonal edges parallel to the direction of movement of the lower platen 17 are used in the adjusting of lower platen height. The platen frame 27 includes on each side a vertical side support 36 near the ends of which a pair of upper wedges 37 and 38 are mounted. The main frame 39 of the planing device has corresponding lower wedges 41 and 42 on each side.

Figure 4:
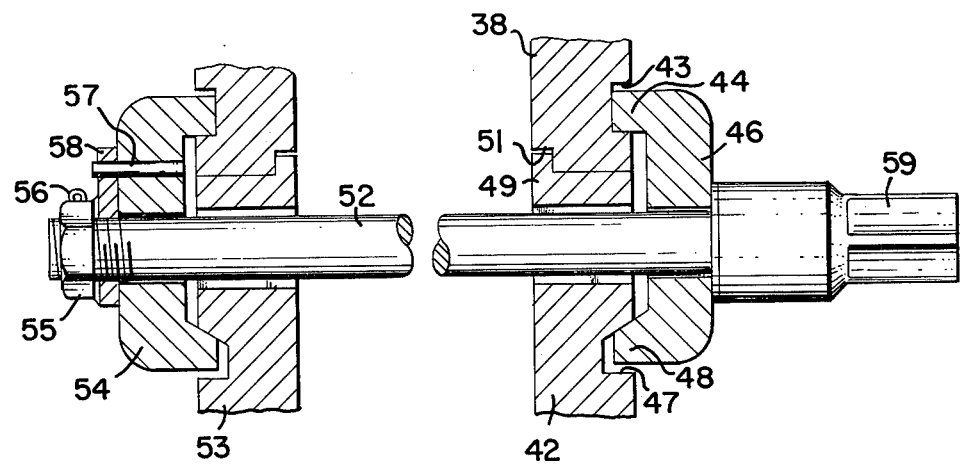
FIG. 4 is a sectional view taken along line 4—4 in FIG. 3.

As seen in FIG. 4, upper wedge 38 has on its outside face a groove 43 parallel to the direction of movement of the lower platen 17, which receives a flange 44 on the inner face of a locking plate 46 having a width less than that of the groove 43. Lower wedge 42 has on its outside face a groove 47 parallel to the groove 44 in the upper wedge 38. While the groove 44 in the upper wedge 38 has a rectangular cross section, the groove 47 in the lower wedge 42 has a trapezoidal, or wedge-shaped, cross section, with the sidewall nearer the upper wedge 38 sloping downward and back from the outside face of the lower wedge 42. The trapezoidal groove 47 receives a correspondingly wedge-shaped flange 48 on the inner face of locking plate 46. When the wedge-shaped flange 48 abuts the sloping sidewall of the groove 47, inward movement of the locking plate 46 brings the flange 44 into abutment with the sidewall of groove 43 nearer the lower wedge 42. The two flanges 44 and 48 then serve to hold the upper wedge 38 and lower wedge 42 together in a longitudinal direction. A flange 49 extending upward from the inner face of the lower wedge 42 engages a mating slot 51 in the adjacent lower edge of the upper wedge 38 to keep the two wedges properly positioned in the lateral direction. It will be understood, of course, that the wedge structure on the opposite side of the platen may be identical.

A rod 52 which is threaded at both ends extends transverse to the lower platen 17 through the locking plate 46 and lower wedge 42, and through an identical lower wedge 53 and locking plate 54 on the opposite side of the platen 17. A nut 55 is secured to one end of the rod 52 by a cotter pin 56 and is provided with a washer 57 which may be welded or otherwise affixed thereto. The nut is locked against rotational movement relative to the plate 54 by means of a pin 58 which extends through the washer 57 and into the locking plate 54. The other end of the rod 52 is threadedly engaged with an extension 59 to which a handcrank may be attached. The handcrank, or any other means commonly known, can be used to rotate the extension 59, which abuts against the locking plate 46, to clamp the locking plates 46 and 54 into engagement with the corresponding upper and lower wedges with the desired degree of pressure in a well known manner.

The height of lower platen 17 is adjusted by first rotating the extension 59 on rod 52, and the identical extension 60 associated with wedges 37 and 41, with a handcrank or other means to loosen the locking plates. The upper wedges are then free to slide diagonally upon the lower wedges. Using a handcrank or other power source, the operator then rotates a rod 61 extending from a worm 62 meshed with a pinion 63. This causes rotation of a threaded rod 64, coupled with the pinion 63 for rotation therewith in any well known manner, within a threaded bore 66 extending from the platen frame 27 parallel to the direction of movement of the platen frame. Since the threaded bore 66 is affixed to the lower platen frame 27, rotation of the rod 64 therein will effect diagonal movement of the lower platen 17. When the lower platen 17 is in the desired position, the locking plates are tightened against the wedges by rotation of the extensions 59 and 60, to lock the platen 17 in position.

Extending from the side support 36 of the platen frame to an identical support on the opposite side of the platen 17 are transverse beams 67, 68, 69 and 70 which serve to add rigidity and strength to the platen frame 27. The number of beams can be varied according to the structural needs of a particular embodiment of the invention. An airbag 72 is mounted on the side of beam 67 nearest the end of the lower platen 17, which is about ten inches from the end of the lower platen 17, and can be pressurized through an air line 71 connected to a conventional source of pressurized air well known in the art, for a purpose described below.

Pivoted from each side support of the platen frame 27 is a V-shaped lever 73 extending downward from the pivot point 74 and then turning diagonally upward toward the end of the lower platen 17. Lever 73 and an identical lever on the opposite side of the frame are connected at their lowest points by a crossbar 75 adjacent a contact plate 79, affixed to the air bag 72 in a conventional manner, against which the air bag 72 expands when pressurized, and at their distal ends by a second connecting crossbar 76 abutting against block 35 which may be welded or otherwise affixed to the angle iron 32. When the device is in use, the air bag 72 is pressurized through the air line 71 and expands against the contact plate 79, exerting pressure on the crossbar 75 to urge the levers upward. The second crossbar 76 pushes upward against the block 35, tending to deflect the end of the lower platen 17 upward. In FIG. 3, the deflection of the lower platen 17 is shown in phantom. For clarity, this flexing movement is exaggerated in the drawing; in actual use, a maximum platen flexure of about ⅛ inch measured in the vertical direction is sufficient. The pressurized air bag has sufficient resiliency to absorb the force of downward deflection of the lower platen 17 when a thick or rough workpiece 12 passes over it.

On either side of the lever 73 near its pivot point 74 are adjustable stops 77 and 78 limiting its range of travel. The stops 77 and 78 include plates 81 and 82, respectively, extending down from the platen frame 27 and having set screws 81 and 82, respectively, engaged therethrough for blocking movement of the lever 73. An identical pair of stops limits the movement of the lever on the opposite side of the device. The first stop 77 limits the extent of upward pivoting of the lever 73 to prevent the platen 17 from flexing to such a degree that it is permanently bent or cracked, while the second stop 78 limits backward pivoting of the lever 73 to prevent the tip of the lower platen 17 from hitting the lower cutting head 22 if an exceptionally thick workpiece 12 were to pass over the lower platen 17.

In operation, the height of the lower platen 17 is set in the manner described above, and the height of the chip breaker shoe 14, upper planing head 18 and upper platen 21 are adjusted by means well known in the art.

Rough lumber workpieces 12 are then fed sequentially between the infeed rollers 11. As one workpiece 12 exits the infeeding rollers 11 and passes onto the lower platen 17, the workpieces which follow it through the infeed rollers 11 will push it through the planing device.

As the workpiece 12 passes under the upper planing head 18, its top surface will be planed smooth, with the chip breaker shoe 14 bearing down on the workpiece 12 to prevent splitting of the wood. The workpiece 12 then passes under the stationary upper platen 21. Unevenness in the bottom surface of the workpiece 12 is accommodated by the flexibility of the cantilevered portion 29 of the lower platen 17, which allows portions of the workpiece 12 of greater thickness to urge the free end of the lower platen 17 slightly downward against the pressure of the air bag 66. The workpiece is thus held against the upper platen as it progresses. The workpiece 12 passes from the lower platen 17 over the lower planing head 22, which surfaces the bottom side, and then exits the housing 20. Workpieces having a thickness less than the target thickness after the upper side is planed will be likewise held against the upper platen 21 by the deflected lower platen 17 and pass over the lower planing head 21 without having their lower sides planed. Workpieces of a thickness about equal to target thickness after their upper sides are planed will have their lower sides planed only to the degree possible while maintaining desired thickness.

Concurrently with the feeding of workpieces through the planer, coolant is circulated through the tube 32 and inlet pipe 33 from a reservoir not shown by conventional means.

While the invention has been described with reference to a preferred embodiment, variations are possible without departing from the scope of the invention.

What is claimed is:

1. An apparatus for holding a workpiece against a fixed platen during surface treatment of one side thereof by a surface treatment element spaced a first predetermined distance from said fixed platen comprising:
    an elongated body having a workpiece contact surface extending parallel to said fixed platen and adjacent said surface treatment element;
    means connected to one end portion of said elongated body remote from said surface treatment element for locating the workpiece contact surface a second predetermined distance from said fixed platen;
    said elongated body having the other end thereof adjacent said surface treatment element free flexing for movement relative to said one end;
    biasing means connected to said free flexing end for applying pressure thereto to bias said free flexing end against the workpiece to maintain contact between the workpiece and said fixed platen to accommodate variations in the thickness of the workpiece; and
    means for driving the workpiece from said one end portion toward said free flexing end of said elongated body to effect surface treatment thereof.

2. The apparatus of claim 1 wherein the thickness of the free flexing end of said elongated body is reduced relative to the remainder of said elongated body to impart resiliency to the free flexing end.

3. The apparatus of claim 1 further comprising means for cooling the free flexing end of said elongated body.

4. The apparatus of claim 3 wherein the cooling means comprises means for circulating coolant fluid in proximity to the free flexing end of said elongated body.

5. The device of claim 1 wherein the biasings means comprises pneumatic means for urging the free flexing end toward the fixed platen.

6. The device of claim 1 further comprising means for holding said workpiece against said elongated body during surface treatment of the opposite side thereof by a second surface treatment element spaced a third predetermined distance from said elongated body remote from said free flexing end.

7. A device for planing two sides of a workpiece comprising:
    a frame,
    a first horizontal surface extending from said frame for supporting the workpiece and having a first end portion and a cantilevered end portion;
    means for moving the workpiece in a linear direction from said first end portion toward said cantilevered end portion;
    means for planing the upper side of the workpiece as it moves across said first surface;
    means located in close proximity to said cantilevered end portion for planing the lower side of the workpiece;

a second horizontal surface extending parallel to and spaced from said cantilevered end portion and said lower planing means; and means for biasing said cantilevered end portion toward said second surface, whereby the workpiece is held against said second surface as the workpiece moves over said lower planing means.

8. The device of claim 7 wherein the means for urging the cantilevered end portion upward comprises pneumatic means.

9. The device of claim 7 wherein the means for urging the cantilevered end portion upward comprises:

a lever pivotally attached to the frame and having one end engaged with the cantilevered end portion, and pneumatic means for exerting pressure on the lever to pivot the lever upward, whereby the lever will deflect the cantilevered end portion upward.

10. The device of claim 9 further comprising cooling means mounted on the cantilevered end portion.

11. The device of claim 10 wherein the cooling means comprises an inlet passage for a coolant fluid running transverse to the cantilevered end portion and an outlet passage for the coolant fluid parallel to the inlet passage, whereby coolant fluid flow in the inlet and outlet passages will dissipate heat in the cantilevered end portion.

12. The device of claim 7 wherein the first surface comprises a metal plate flexible at its cantilevered end portion.

13. A device for planing opposing sides of a workpiece comprising:

a first surface;

means for supporting the first surface in a cantilevered manner, whereby the first surface has a cantilevered end portion;

means for feeding the workpiece across the upper side of the first surface toward the cantilevered end portion;

means for planing the upper side of the workpiece as it is fed across the first surface;

a second surface parallel to the first surface and having a first end extending over the cantilevered end portion;

means for applying upward pressure on the cantilevered end portion, whereby the cantilevered end portion will flex upward to hold the workpiece against the lower side of the second surface;

means for feeding the workpiece across the lower side of the second surface as it is held against the second surface; and means for planing the lower side of the workpiece as it is fed across the second surface.

14. The device of claim 13 wherein the means for feeding the workpiece across the first surface comprises a pair of oppositely rotating rollers in close proximity to the end of the first surface remote from the cantilevered end portion.

15. The device of claim 13 further comprising means for cooling the cantilevered end portion.

16. The device of claim 15 wherein the cooling means comprises coolant fluid, an inlet conduit in proximity to the cantilevered end portion, an outlet conduit in communication with the inlet conduit and means for circulating the coolant fluid through the inlet and outlet conduits.

17. The device of claim 13 wherein the means for applying upward pressure on the cantilevered end portion comprises:

a lever having a first end in contact with the lower side of the cantilevered end portion;

an expandable air bag for urging the first end of the lever upward; and means for pressurizing the air bag.

18. A method for holding one side of a downstream-moving workpiece in constant contact with a stationary platen during surface treatment of the other side of the workpiece, comprising the steps of:

supporting one end of a semi-rigid elongated surface member in a fixed position a predetermined distance from said stationary platen;

providing a free flexing cantilevered end portion of said surface member, disposed downstream of said one end;

exerting a resilient bias against said cantilevered end portion to maintain contact between the one side of the workpiece and said stationary platen to accommodate variation in the thickness of the workpiece; and after the resilient bias has been exerted, effecting surface treatment of the workpiece.

* * * * *